(12) United States Patent
Gaye et al.

(10) Patent No.: US 10,197,119 B2
(45) Date of Patent: Feb. 5, 2019

(54) SLIDING CALIPER DISC BRAKE HAVING EVACUATION OF AIR BETWEEN PINS AND BORES

(71) Applicant: CHASSIS BRAKES INTERNATIONAL B.V., Amsterdam (NL)

(72) Inventors: André Gaye, Dalian (CN); Sandra Merrien, Paris (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 0 days.

(21) Appl. No.: 15/037,053

(22) PCT Filed: Nov. 12, 2014

(86) PCT No.: PCT/EP2014/074375
§ 371 (c)(1),
(2) Date: May 17, 2016

(87) PCT Pub. No.: WO2015/071309
PCT Pub. Date: May 21, 2015

(65) Prior Publication Data
US 2016/0273596 A1    Sep. 22, 2016

(30) Foreign Application Priority Data

Nov. 18, 2013 (FR) ...................................... 13 61310

(51) Int. Cl.
*F16D 55/2265*    (2006.01)
*F16D 55/227*    (2006.01)

(52) U.S. Cl.
CPC ..... *F16D 55/22655* (2013.01); *F16D 55/227* (2013.01)

(58) Field of Classification Search
CPC ............... F15D 55/227; F15D 55/2265; F15D 55/22655; F15D 65/0006; F15D 65/0087; F15D 2055/0041
(Continued)

(56) References Cited

U.S. PATENT DOCUMENTS 4,049,086 A * 9/1977 Rath ................. F16D 55/22655
188/73.36
4,311,219 A * 1/1982 Watanabe ......... F16D 55/22655
188/196 P
(Continued)

FOREIGN PATENT DOCUMENTS

CN    202349032    7/2012
CN    103062262    4/2013
(Continued)

OTHER PUBLICATIONS

International Search Report PCT/EP2014/074375 dated Aug. 11, 2015.

*Primary Examiner* — Robert A. Siconolfi
*Assistant Examiner* — San M Aung
(74) *Attorney, Agent, or Firm* — Young & Thompson

(57) ABSTRACT

A motor vehicle disc brake including a cover (12) including two bores, a sliding caliper, two pins (16) for guiding the caliper, each whereof includes a guiding section (24) which is slidably mounted in a section (28) of a bore wherein each pin (16), engaging with the wall of the bore (29), defines an axial channel (65), and each pin (16) receives a tubular sealing cap wherein an inner wall includes at least one radial groove or a radial channel communicating with the axial channel (65) defined by the associated pin.

5 Claims, 2 Drawing Sheets

(58) Field of Classification Search
USPC .......................................... 188/73.45, 73.44
See application file for complete search history.

(56) References Cited

U.S. PATENT DOCUMENTS

| | | | | |
|---|---|---|---|---|
| 4,401,194 | A | * | 8/1983 | Klassen ............ F16D 55/22655 188/73.44 |
| 4,427,096 | A | * | 1/1984 | Stoka .................... F16D 55/227 188/73.34 |
| 4,491,205 | A | * | 1/1985 | Rath ................. F16D 55/22655 188/73.32 |
| 5,069,313 | A | * | 12/1991 | Kato ..................... B60T 17/221 188/72.3 |
| 2006/0049008 | A1 | * | 3/2006 | Kinoshita ......... F16D 55/22655 188/73.39 |
| 2013/0161134 | A1 | * | 6/2013 | Kobayashi ............ F16D 65/095 188/73.44 |
| 2014/0116817 | A1 | * | 5/2014 | Morais ................ F16D 55/2265 188/73.45 |

FOREIGN PATENT DOCUMENTS

| | | |
|---|---|---|
| CN | 203082090 | 7/2013 |
| DE | 202006006142 | 7/2006 |

* cited by examiner

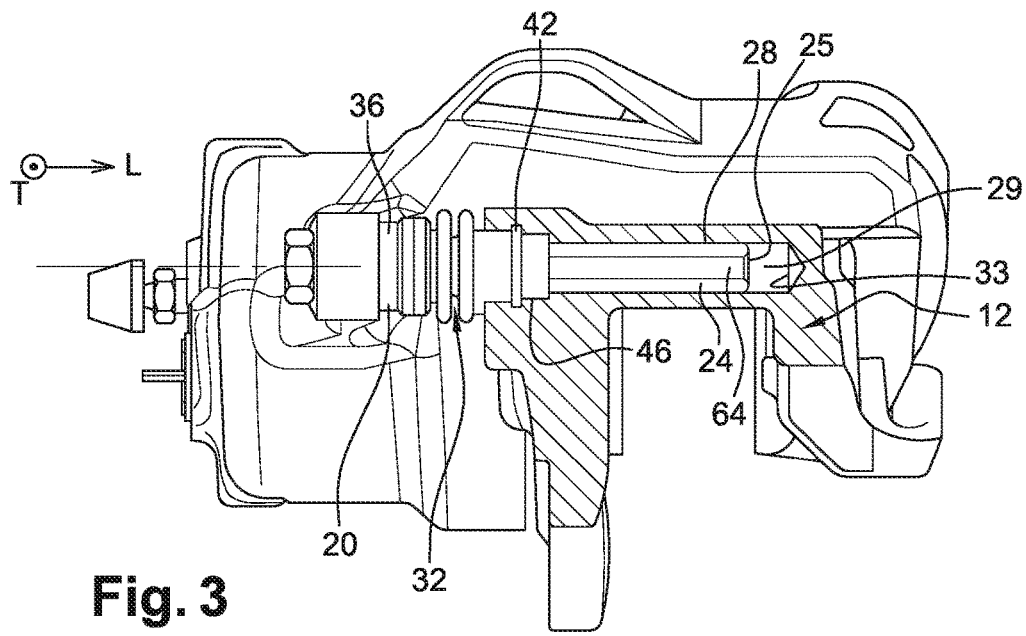
Fig. 3
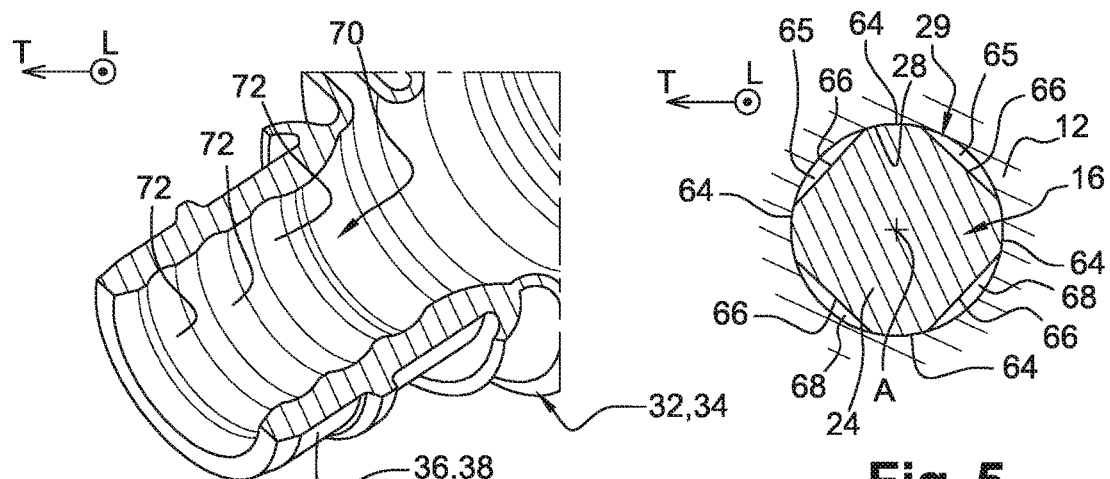
Fig. 4
Fig. 5

SLIDING CALIPER DISC BRAKE HAVING EVACUATION OF AIR BETWEEN PINS AND BORES

TECHNICAL FIELD OF THE INVENTION

The invention relates to a motor vehicle disc brake.

TECHNICAL BACKGROUND OF THE INVENTION

The invention relates more particularly to a motor vehicle disc brake including:
- a cover including two tiered bores of parallel axes, each whereof includes at least one first section;
- a caliper slidably mounted axially with respect to the cover;
- two pins of parallel axes, each whereof includes an axial attachment end attached to the caliper and at least one guiding section for axial sliding of the caliper with respect of the cover which extends from a free end of the associated pin and which is slidably mounted in the first section of the associated tiered bore of the cover.

In this design, the guiding section of each pin is slidably mounted in the first section of the associated bore which is blind or closed, for the purposes of tightness and protection of this sliding guiding zone, and a quantity of air is thus trapped between the free end of the guiding section of the pin and the base of the first section of the associated bore.

During the axial insertion of the pin into the associated bore on the fitting and assembly line, or during the so-called "de-braking" phase when the disc pushes back the brake pad and the caliper, this volume is reduced by progressive forward motion of the free end of the guiding section of the pin towards the base of the first section of the bore.

So that the volume of air trapped does not impede, or abut against, this forward motion, it is necessary to provide means enabling the progressive evaluation of the trapped air.

The prior art particularly includes a series of solutions requiring modifications, that are complex to carry out, of the tiered bore which further affect the sliding guiding capabilities of the associated pin.

BRIEF SUMMARY OF THE INVENTION

In order to remedy these drawbacks, and solve the problem of air evacuation, the invention proposes a motor vehicle disc brake including:
- a cover including two tiered bores of parallel axes, each whereof includes at least one first section;
- a caliper slidably mounted axially with respect to the cover;
- two pins of parallel axes, each whereof includes:
- an axial attachment end attached to the caliper; and
- at least one guiding section for axial sliding of the caliper with respect to the cover which extends from a free end of the associated pin which is facing a base of said first section, said guiding section being slidably mounted in the first section of the associated tiered bore of the cover, characterised in that:
- each pin, engaging with the wall of the bore, defines at least one axial channel extending from said free end of the pin,
- the associated tiered bore of the cover includes, on the side of the end for attaching the pin to the caliper, a second section,
- each pin receives a tubular sealing cap wherein one section is inserted radially between the associated pin, and said second section and
- an inner wall of each tubular cap includes at least one radial groove or a radial channel communicating with said at least one axial channel defined by the associated pin.

According to further features of the invention:
- the inner wall of each tubular cap includes at least one annular radial groove communicating with said at least one axial channel defined by the associated pin;
- the inner wall of each tubular cap includes a plurality of annular radial grooves which are regularly spaced apart along an entire axial length of said cap and each whereof is suitable for communicating with said at least one axial channel defined by the associated pin, according to the axial position of the caliper with respect to the fixed cover;
- the inner wall of each tubular cap includes at least one helicoidal radial groove extending along an entire axial length of said cap and communicating with said at least one axial channel defined by the associated pin;
- each pin includes at least one flat section extending from the free end of the pin along a length greater than that of said guiding section and which, engaging with the wall of the bore, defines at least one axial channel extending from the free end of the pin and communicating with the space defined by said base, by the lateral wall of the bore and by a transverse face of the free end of the pin.

BRIEF SUMMARY OF THE FIGURES

Further features and advantages of the invention will emerge on reading the detailed description hereinafter for the comprehension whereof, reference will be made to the appended figures wherein:

FIG. 3 is a side view, with partial cutaway, representing the caliper and the cover in FIG. 1;

FIG. 4 is a detailed view illustrating the internal axial bore of a sealing cap of a disc brake according to the invention;

FIG. 5 is a sectional view through a transverse plane of a first section of a pin received in a first section of the bore of the disc brake according to the invention.

DETAILED DESCRIPTION OF THE FIGURES

In the description and claims hereinafter, expressions such as "longitudinal orientation", "transversal", etc. will be used in a non-restrictive manner with reference to the dihedron (L, T) represented in the figures and the definitions given in the description.

In the description hereinafter, identical reference numbers denote identical or equivalent parts or parts having similar functions.

Figure 1:
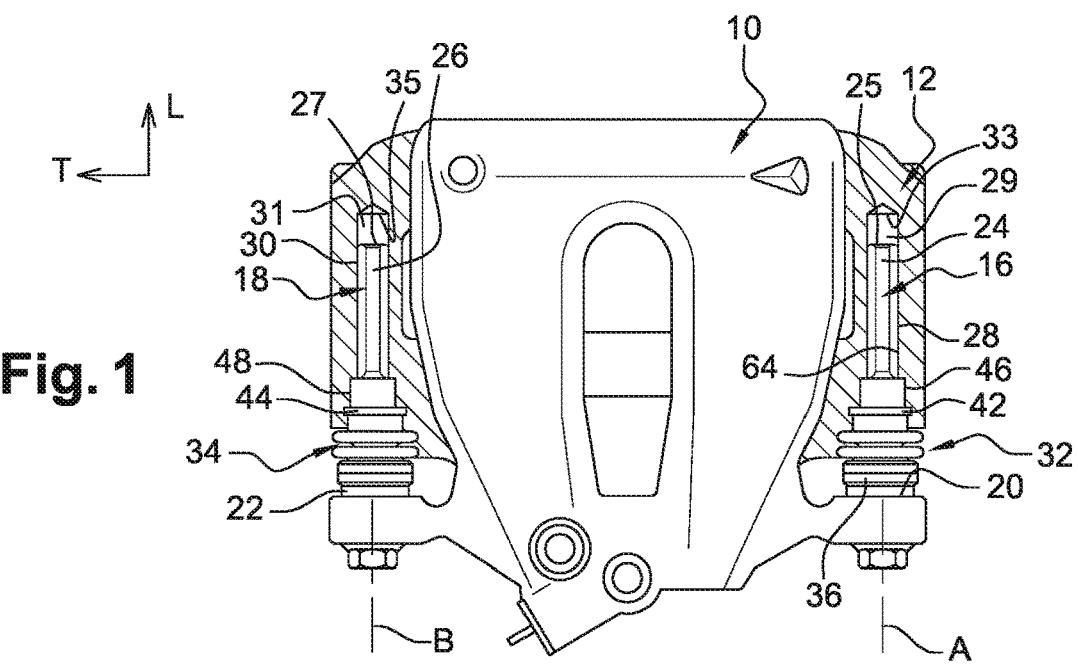
FIG. 1 is a top view, with partial cutaways, of a caliper and a cover of a disc brake, particularly illustrating the engagement of each pin of the caliper in the associated tiered bore of the cover of a disc brake according to the invention.
Figure 2:
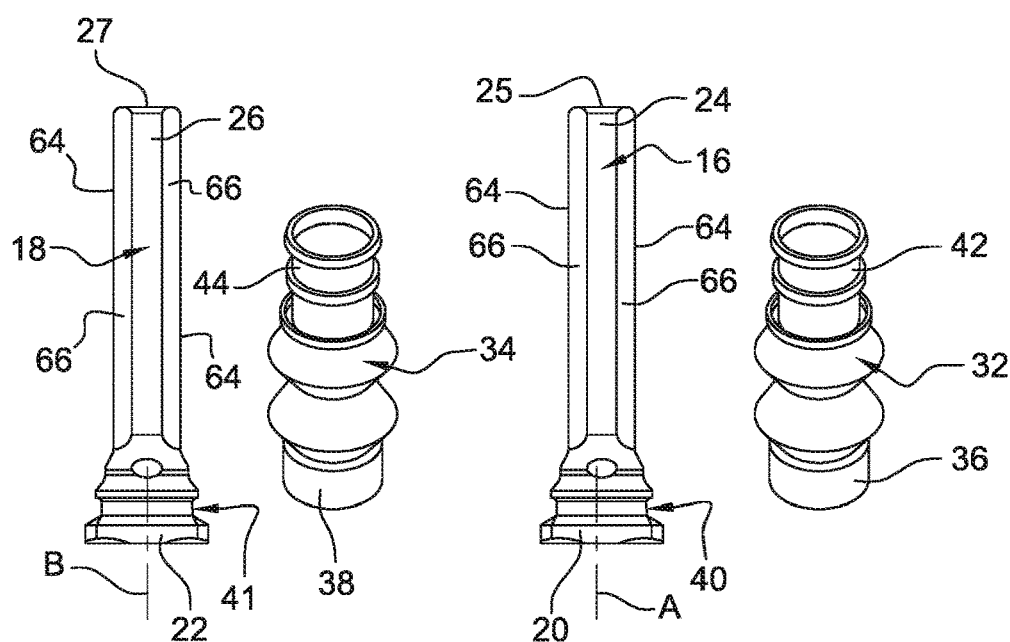
FIG. 2 is a side and perspective view on a larger scale of the two pins and the two sealing caps of the disc brake in FIG. 1.

FIGS. 1 and 3 represent a caliper 10 and a cover 12 of a motor vehicle disc brake (not shown) embodied according to the prior art. In a known manner, the disc brake includes a fixed cover 12 including two tiered bores 29, 31 of parallel axes A, B, each whereof includes at least one first blind section 28, 30.

The brake also includes a caliper 10 which is axially slidably mounted, along a longitudinal direction parallel with the axes A and B, with respect to the fixed cover 12. The caliper 10 is slidably mounted with respect to the cover 12 by means of two parallel pins 16, 18 of axes A, B, each whereof includes a first axial end 20, 22 which is attached to the caliper 10, and includes at least one section, blind or sealed, 24, 26 for guiding the axial sliding of the caliper 10 with respect to the cover 12 which is slidably mounted, with a radial clearance, in the first section 28, 30 of the associated tiered bore 29, 31 of the cover 12.

The outer cylindrical guiding surface of the section 24, 26 for guiding each pin 16, 18 includes herein, by way of non-limiting example, and as can be seen in FIG. 5, four axial portions 64, which are diametrically opposed in pairs, and each whereof extends angularly about the axis A, B of each pin 16, 18.

To embody the portions 64, each portion 64 is for example defined by a pair of flat sections 66 of axial orientation.

Each section 24, 26 of each pin 16, 18 is thus obtained herein using a section of cylindrical cross-section wherein four flat sections 66 are formed.

Each axial portion 64, extends herein along the same axial length.

Each guiding section 24, 26 extends from a free end 25, 27 of the associated pin 16, 18 which is facing the base 33, 35 of the associated first section 28, 30.

As such, each guiding section offers a maximum length for the axial guiding of the caliper.

To particularly enable the evacuation, or "decompression", of the air contained in the blind tiered bores 29 and 30, at least one flat section 66 of each pin 16, 18 extends from the free end 25, 27 of the pin along a length greater than that of the guiding section 24, 26.

Due to the presence of at least one flat section 66, each pin, engaging with the wall of the blind bore 29, 31, defines at least one axial channel 65 which extends from the free end 25, 27 of the pin and communicates with the space defined by the base 33, 35, by the concave lateral wall of the bore 29, 30 and by the transverse face of the free end 25, 27 of the associated pin 16, 18.

Each associated tiered bore 29, 31 of the cover 12 includes, on the side of the end 20, 22 for attaching the pin 16, 18 to the caliper 10, a second so-called "entry" section 46, 48, and each pin 16, 18 receives a tubular cap 32, 34 made of elastomer material an axial section whereof is inserted radially between the associated pin 16, 18 and the second entry section 46, 48.

The caps 32, 34 ensure the tightness of the tiered bores 29, 31 to dust.

Each cap 32, 34 includes an end 36, 38 which is fitted onto a collar 40, 41 of the end 20, 22 for attaching each pin 16, 18, and it includes an opposite section 42, 44 which is inserted radially between each pin 16, 18 and the second entry section 46, 48 of the associated tiered bore 29, 31 of the cover 12.

To enable the decompression of the air contained in the tiered bores 29 and 30, the caps 32, 34 are associated with the flat sections (66) mentioned above by proposing, for each pin, at least one channel 65 allowing air to flow outside.

For this purpose, one wall of the internal bore 70 of each tubular cap 32, 34 includes at least one internal radial groove 72.

In this embodiment, the internal radial groove 72 "intersects" with at least one axial channel 65, defined by a flat section 66 of the pin in question and by the wall of the bore 29, 31.

The fluidic communication between the axial channel 65 and the groove 72 is ensured continuously, and as such the circulation and progressive evacuation of the air contained in the space defined at the blind front end of the bore 29, 31 (wherein the channel 65 opens) to the outside environment, i.e. to the bellows-shaped end parts.

According to a first embodiment of the caps 32, 34 according to the invention, which is represented in FIG. 4, the inner wall 70 of each tubular cap 32, 34 includes a plurality of annular radial grooves 72 which are regularly spaced along the entire length of the cap 32.

Alternatively, according to a second embodiment (not shown), the inner wall 70 of the cap 32, 34 includes a single helicoidal groove, of determined pitch, extending along the entire axial length of the cap 32, 34 and which, for this reason, "intersects" with said axial channels at a plurality of points.

In the example of an embodiment of pins described above, each pin defined, in a non-limiting manner, four axial channels 65, each whereof is continuously in communication with at least one radial groove 72 for evacuation of air to the "outside".

The non-axial orientation of the grooves further makes it possible not to penalise the other functions such as the guiding for sliding.

The invention is not limited to the principle design described above. According to one conventional "mechanical inversion" in the field, the pins can be attached to the caliper and the associated bores can be formed in the cover.

The invention is likewise not limited to the proposed design of one or a plurality of axial channel(s) 65 obtained using one or a plurality of flat section(s) 66. Alternatively, at least one channel connecting the blind end of the bore with a groove or channel of the associated cap can be embodied in any suitable form.

The invention claimed is:

1. Motor vehicle disc brake including:
   a cover (12) including two tiered bores of parallel axes, each whereof includes at least one first section (28, 30);
   a caliper (10) slidably mounted axially with respect to the cover (12);
   two pins (16, 18) of parallel axes (A, B), each whereof includes:
      an axial attachment end (20, 22) attached to the caliper (10); and
      at least one guiding section (24, 26) for axial sliding of the caliper (10) with respect to the cover (12) which extends from a free end (25, 27) of the associated pin (16, 18) which is facing a base (33, 35) of said first section (28, 30), said guiding section being slidably mounted in the first section (28, 30) of the associated tiered bore (29, 31) of the cover (12),
   wherein:
   each pin (16, 18), engaging with the wall of the bore (29, 31), defines at least one axial channel (65) extending from said free end (25, 27) of the pin,
   the associated tiered bore (29, 31) of the cover (12) includes, on the side of the end (20, 22) for attaching the pin (16, 18) to the caliper, a second section (46, 48),
   each pin (16, 18) receives a tubular sealing cap (32, 34) wherein one section (42, 44) is inserted radially between the associated pin (16, 18), and said second section (46, 48) and an inner wall (70) of each tubular cap (32, 34) includes at least one radial groove or a radial channel (72) communicating with said at least one axial channel (65) defined by the associated pin.

2. Disc brake according to claim 1, wherein the inner wall (70) of each tubular cap (32, 34) includes at least one annular radial groove (72) communicating with said at least one axial channel (65) defined by the associated pin.

3. Disc brake according to claim 2, wherein the inner wall (70) of each tubular cap (32, 34) includes a plurality of annular radial grooves (72) which are regularly spaced apart along an entire axial length of said cap (32) and each whereof is suitable for communicating with said at least one axial channel (65) defined by the associated pin, according to the axial position of the caliper with respect to the fixed cover.

4. Motor vehicle disc brake including:
a cover (12) including two tiered bores of parallel axes, each whereof includes at least one first section (28, 30);
a caliper (10) slidably mounted axially with respect to the cover (12);
two pins (16, 18) of parallel axes (A, B), each whereof includes:
an axial attachment end (20, 22) attached to the caliper (10); and
at least one guiding section (24, 26) for axial sliding of the caliper (10) with respect to the cover (12) which extends from a free end (25, 27) of the associated pin (16, 18) which is facing a base (33, 35) of said first section (28, 30), said guiding section being slidably mounted in the first section (28, 30) of the associated tiered bore (29, 31) of the cover (12),
wherein:
each pin (16, 18), engaging with the wall of the bore (29, 31), defines at least one axial channel (65) extending from said free end (25, 27) of the pin,
the associated tiered bore (29, 31) of the cover (12) includes, on the side of the end (20, 22) for attaching the pin (16, 18) to the caliper, a second section (46, 48),
each pin (16, 18) receives a tubular sealing cap (32, 34) wherein one section (42, 44) is inserted radially between the associated pin (16, 18), and said second section (46, 48),
an inner wall (70) of each tubular cap (32, 34) includes at least one radial groove or a radial channel (72) communicating with said at least one axial channel (65) defined by the associated pin, and
at least one helicoidal radial groove extending along an entire axial length of the inner wall (70) of said cap (32) and communicating with said at least one axial channel (65) defined by the associated pin.

5. Disc brake according to claim 1, wherein each pin (16, 18) includes at least one flat section (66) extending from the free end (25, 27) of the pin along a length greater than that of said guiding section 24, 26 and which, engaging with the wall of the bore (29, 31), defines at least one axial channel (65) extending from the free end (25, 27) of the pin and communicating with the space defined by said base (33, 35), by the lateral wall of the bore and by a transverse face of the free end (25, 27) of the pin (16, 18).

* * * * *